US005631313A

United States Patent [19]
Bishop et al.

[11] Patent Number: 5,631,313
[45] Date of Patent: May 20, 1997

[54] SUSPENDING MEDIUM FOR PARTICULATE MATERIAL

[75] Inventors: Marshall D. Bishop; John E. Hostettler, both of Bartlesville, Okla.

[73] Assignee: Phillips Petroleum Company, Bartlesville, Okla.

[21] Appl. No.: 791,845

[22] Filed: Nov. 14, 1991

Related U.S. Application Data

[63] Continuation-in-part of Ser. No. 513,539, Apr. 24, 1990, Pat. No. 5,091,448.
[51] Int. Cl.$^6$ ............... C08J 3/00; C08K 3/00; C08L 95/00; C09K 7/00
[52] U.S. Cl. ............... 524/45; 523/130; 524/8; 524/59; 524/62; 524/65; 524/66; 524/68; 524/70; 524/71; 524/72; 524/76; 524/406; 524/418; 524/420; 524/419; 524/432; 524/474; 524/478; 524/528
[58] Field of Search ............... 523/130; 524/8, 524/59, 62, 65, 66, 68, 70, 71, 72, 76, 406, 418, 420, 419, 432, 474, 478, 528, 45

[56] References Cited

U.S. PATENT DOCUMENTS

| 4,256,811 | 3/1981 | Black | 524/406 |
| 4,305,855 | 12/1981 | Bretz | 524/62 |
| 4,330,447 | 5/1982 | Lundberg et al. | 524/400 |
| 4,514,308 | 4/1985 | Clampitt et al. | 523/130 |
| 4,952,328 | 8/1990 | Davis et al. | 252/39 |
| 5,023,282 | 6/1991 | Neubert | 524/71 |
| 5,132,355 | 7/1992 | Nahlovsky | 524/474 |

*Primary Examiner*—Paul R. Michl
*Assistant Examiner*—P. Niland
*Attorney, Agent, or Firm*—Richmond, Phillips, Hitchcock & Fish

[57] ABSTRACT

A new stable liquid suspension of a non soluble particulate material, and a method of preparation of same are provided. Such compositions comprise at least one oil, one oil soluble resin and a non oil soluble particulate material mixed together In the appropriate quantities and conditions.

20 Claims, No Drawings

SUSPENDING MEDIUM FOR PARTICULATE MATERIAL

This invention is a continuation-in-part of Ser. No. 07/513,539 filed Apr. 24, 1990, now U.S. Pat. No. 5,091,449 which is incorporated herein by reference.

BACKGROUND OF THE INVENTION

This invention relates to preparing stable suspensions of particulate materials.

Suspending mediums are commonly used for oil field additives, lubricants, coatings and paints. The industry goal has been, and still is, to improve the stability of these suspending mediums to extend the shelf life of products which contain suspended particulate materials. Settling out of the suspended particulate materials is a pronounced problem with materials which have high specific gravities such as tin or zinc particles. Those suspensions which do resist settling tend to be too viscous to pour.

Attempts to meet the above stated goals have been made in the art. Such efforts have employed a wide variety of agents including mixtures of organophyllic clays and water or oils, and polyethylene and mineral oil. Although these suspending mediums or compositions individually and collectively have improved on the art, the ultimate goal of providing an ideal suspension, i.e. one which resist settling, is pourable, easy to manufacture and is useable over a wide temperature range, remains to be solved.

SUMMARY OF THE INVENTION

It is a general object of this invention, to provide a suspension which resists settling and is readily pourable.

It is also another object of this invention to provide a process for forming stable liquid suspensions which are resistant to settling and are readily pourable.

In accordance with the present invention a stable liquid suspension is provided comprising an oil, an oil soluble resin and a non oil soluble particulate material selected from the group consisting of lime (calcium oxide in its various forms such as quicklime, hydrated lime, and hydraulic lime), sodium bicarbonate ($NaHCO_3$), sodium carbonate ($Na_2CO_3$), molybdenum disulfide ($MoS_2$), sodium hydroxide (NaOH), graphite, zinc, tin, quebracho, lignin, lignite, caustisized lignite, lignosulfonate, chrome lignosulfonate, napthalenesulfonate, uintahite (gilsonite), and polyvinylalcohol.

In accordance with another embodimemt of the present invention there is also provided a method for forming a stable liquid suspension comprising mixing the following constituents: an oil, an oil soluble resin and a non oil soluble particulate material selected from the group consisting of lime (calcium oxide in its various forms such as quicklime, hydrated lime, and hydraulic lime), sodium bicarbonate ($NaHCO_3$), sodium carbonate ($Na_2CO_3$), molybdenum disulfide $MoS_2$, sodium hydroxide (NaOH), graphite, zinc, tin, quebracho, lignin, lignite, caustisized lignite, lignosulfonate, chrome lignosulfonate, napthalenesulfonate, uintahite (gilsonite), and polyvinylalcohol, in a manner which facilitates forming a stable liquid suspension.

DETAILED DESCRIPTION OF THE INVENTION

We have discovered that a very stable suspension may be formed by mixing a suitable oil, suitable oil soluble resin, and at least one non oil soluble particulate material. We originally developed this suspension for suspending water soluble polymer but have subsequently discovered that the suspending medium is capable of suspending a variety of other very different compounds. Surprisingly, the suspension medium is able to suspend particulate material having high densities, such as molybdenum disulfide, lime, zinc and tin. Further, the composition does not generally require additional processing in order to be used. Because of its exceptional stability the liquid suspension of the invention can be prepared and shipped to customers ready to use and does not need to be remixed before use in the field.

The oils useful in the practice of this invention broadly include hydrocarbon oils including but not limited to vegetable oils, crude oil, diesel oils, kerosene, pentane, decane, soybean oil, corn oil and combinations of two or more thereof. However, the preferred oils for purposes of this invention are kerosene, diesel oil, light diesel oil, heating oil, mineral oil, end iso-paraffins. Most particulary preferred are the iso-paraffins including but not limited to tetradecane, hexadecane, dodecane, mixed iso-paraffins (such as mixed $C_{13}$–$C_{14}$ iso-paraffins), $C_{14}$ iso-paraffins, and $C_{16}$ iso-paraffins.

Generally, oil soluble resins are useful in the practice of this invention. Examples of suitable oil soluble resins are those selected from the group consisting of styrene-isoprene copolymers, hydrogenated styrene-isoprene block copolymers, styrene ethylene/propylene block copolymers, styrene isobutylene copolymers, styrene butadiene copolymers, polybutylene and polystyrene, polyethylene-propylene copolymers, include copolymers and block copolymers such as poly(styrene-co-isoprene), hydrogenated block-copoly(styrene/isoprene), block-copoly (styrene/ethylene/propylene), poly(styrene-co-isobutylene), copolymer(styrene-co-butadiene), polybutylene, polystyrene, copolymer(polyethylene-co-propylene), and combinations of two or more thereof. These oil soluble resins should have a molecular weight in tile range of from about 40,000 to about 100,000. Preferred, however, are block copolymers, examples of which include but are not limited to block-copoly(styrene/ethylene/propylene), hydrogenated block-copoly(styrene/isoprene) and block-copoly (styrene/butadiene). Most particularly preferred are hydrogenated (styrene-isoprene) copolymers and styrene-butadiene copolymers examples of which include but are not limited to materials sold under the trademarks "BARARESIN VIS"(trademark of Baroid Corporation), "SHELLVIS 40" and "SHELLVIS 50" (both trademarks of Shell Chemical Company).

Suitable non oil soluble particulate materials for suspending in the liquid suspension medium are particles which are not soluble in the suspending medium. It is preferred that the average diameter of the particles be in the range of from about 2000 microns to about 0.1 microns. It is also preferred that the particulate materials have a density of in the range of from about 1.5 g/cm³ to about 7 g/cm³. It is currently believed that the more dense particulate materials will be suspended for longer periods of time if the particle size of these materials is reduced in proportion to the materials' increasing density. For example, tin can be suspened for longer periods of time if the particle size of the tin particles is less than 100 microns in size. As shown in the Examples tin can be susupended in excess of 30 days without settling occurring with a particle size of less than 100 microns. Examples of suitable non oil soluble particulate materials for the practice of the present invention include but are not limited to particles selected from the group consisting of lime (calcium oxide in its various forms such as quicklime, hydrated lime, and hydraulic lime), sodium bicarbonate (NaHCO₃), sodium carbonate (Na₂CO₃), molybdenum disulfide (MoS2), sodium hydroxide (NaOH), graphite, zinc, tin, quebracho, lignin, lignite, caustisized lignite, lignosulfonate, chrome lignosulfonate, napthalenesulfonate, uintahite sulfonated asphalt, sulfomethylated tannin (gilsonite), and polyvinylalcohol. As discussed above the choice of the appropriate particle size for the particular particulate material in each suspension can be readily determined by systematicly testing a variety of particle sizes in the suspending medium to achieve an optimum stablity.

The ranges of the ingredients listed above useful in the practice of this invention are as shown in Table 1 below.

TABLE 1

| Composition Components[b] | Broad (%)[a] | Preferred (%) | Most Preferred (%) |
| --- | --- | --- | --- |
| Oil | 40–95 | 55–60 | 57–59 |
| Resin | 0.2–10 | 1.8–5 | 2–2.5 |
| Non oil soluble Particulate Material | 3–60 | 37–45 | 38–40 |

[a] All weights in Table I are in weight percent wherein the total weight percent totals 100 weight percent.
[b] The ranges of the composition components shown in Table I are all physical mixtures.

The mixing conditions for carrying out the practice of the invention are as follows: The temperature is generally in the range of about –10° C. to about 200° C., with a preferred range of about 0° C. to about 150° C., and a most preferred range of about 60° C. to about 70° C. The mixing time is generally in the broad range of about 0.05 hours to about 200 hours, with a preferred range of about 0.25 hours to about 20 hours, and a most preferred range of about 1 hour to about 2 hours. It is noted that the mixing time is generally inversely proportional to the reaction temperature i.e., the lower the temperature the more time is required.

In one embodiment, the process of this invention comprises introducing a suitable oil into a suitable mixing device and adding a suitable resin to the oil in the mixing device. The oil-resin mixture is then mixed for about 30–45 minutes at a temperature range of about 60° C. to about 70° C. To this oil-resin mixture is then added a suitable non oil soluble particulate material.

The end product of this process is a stable liquid suspension which can then be collected by any technique known in the art. While the order of mixing is not a critical aspect of this invention, it is preferred to add the oil first and non oil soluble particulate material last.

The addition of an antioxidant, a surfactant, a biocide, or hydrophobic fumed silica to these basic ingredients is an option which can be exercised by those of skill in the art. When added hydrophobic fumed silica can be in an amount in the range of up to 10 weight percent.

The product of this invention normally has a gel strength that is capable of suspending particulate matter. Additionally, this gel strength develops very rapidly or almost immediately and is of the type referred to in the art as flat gels. By this is meant that unlike normal gels, its gel strength stays constant or increases only slightly with time and that it has desirable fragile properties evidenced by the ease with which it pours.

The product of this Invention is primarily tested by observation for syneresis, pour point, and stability over a wide temperature range. Syneresis can be measured by means of a ruler or other such graduated device. This can be accomplished by inserting the ruler or graduated device through the clear liquid portion of the suspension until it contacts the interface that separates this portion, from the layer containing suspended solids. The thickness of the clear liquid layer, the measure of syneresis, can then be determined directly on the ruler or graduated device.

The following examples further illustrate the various aspects of this invention.

EXAMPLE 1

This composition contains the following components:

| | |
| --- | --- |
| light isoparrafin oil (1) | 560 g |
| oil soluble resin (2) | 20 g |
| sulfonated asphalt (3) | 387 g |
| Total | 967 g |

(1) A $C_{13}$–$C_{14}$ isoparaffin mixture available under the brand "SOLTROL 170" (0.778 g/ml), from Phillips Petroleum Company.
(2) A hydrogenated styrene-isoprene copolymer available under the brand "SHELL VIS 40", from Shell Chemical Company.
(3) Available under the brand "SOLTEX", from Phillips Petroleum Company.

The oil soluble resin was sheared into the light isoparrafin oil with a Ross mixer at a setting of 5 until the temperature reached 62° C. The mixer was then shut off and the mixture allowed to cool to near room temperature. Shearing was then continued until all of the oil soluble resin was incorporated (visual observation). The sulfonated asphalt was then blended into the mixture.

The sample was then split. One sample was placed into the freezer at –20° F. (–29° C.) until the temperature stabilized in order to test for the pour point. No syneresis or settling was observed and the sample remained pourable. The other sample was placed in the oven 120° F. (49° C.) and static aged for twelve months. No syneresis or settling was reported.

This demonstrated that a stable liquid suspension of a sulfonated asphalt was obtained.

EXAMPLE 2

This composition contains the following components:

| | |
| --- | --- |
| light isoparrafin oil (1) | 560 g |
| oil soluble resin (2) | 20 g |
| sulfomethylated tannin (3) | 387 g |
| Total | 967 g |

(1) A $C_{13}$–$C_{14}$ isoparaffin mixture available under the brand "SOLTROL 170" (0.778 g/ml), from Phillips Petroleum Company.
(2) A hydrogenated styrene-isoprene copolymer available under the brand "SHELL VIS 40", from Shell Chemical Company.
(3) Available under the brand "DESCO", from Phillips Petroleum Company.

The oil soluble resin was sheared into the light isoparrafin oil with a Ross mixer at a setting of 5 until the temperature reached 62° C. The mixer was then shut off and the mixture allowed to cool to near room temperature. Shearing was then continued until all of the oil soluble resin was incorporated (visual observation). The sulfomethylated tannin was then blended into the mixture.

The sample was then split. One sample was placed into the freezer at –20° F. (–29° C.) until the temperature stabilized in order to test for the pour point. No syneresis or settling was observed and the sample remained pourable. The other sample was placed in the oven at 120° F. (49° C.) and static aged for twelve months. No syneresis or settling was reported.

This demonstrated that a stable liquid suspension of a sulfomethylated tannin was obtained.

EXAMPLE 3

This composition contains the following components:

| light isoparrafin oil (1) | 560 g |
|---|---|
| oil soluble resin (2) | 20 g |
| powdered tin metal (3) | 387 g |
| Total | 967 g |

(1) A $C_{13}$–$C_{14}$ isoparaffin mixture available under the brand "SOLTROL 170" (0.778 g/ml), from Phillips Petroleum Company.
(2) A hydrogenated styrene-isoprene copolymer available under the brand "SHELL VIS 40", from Shell Chemical Company.
(3) 200 mesh.

The oil soluble resin was sheared into the light isoparrafin oil with a Ross mixer at a setting of 5 nntil the temperature reached 62° C. The mixer was then shut off and the mixture allowed to cool to near room temperature. Shearing was then continued until all of the oil soluble resin was incorporated (visual observation). The powdered tin metal was then blended into the mixture.

The sample was then split. One sample was placed into the freezer at–20° F. (–29° C.) until the temperature stabilized in order to test for the pour point. No syneresis or settling was observed and the sample remained pourable. The other sample was placed in the oven at 120° F. (49° C.) and static aged for two weeks. ¾ inch of syneresis was noted at that time. The sample remained in the oven for another 3 ½ months without showing further signs of syneresis. No hard settling was observed.

This demonstrated that a stable liquid suspension of a powdered tin metal was obtained.

EXAMPLE 4

This composition contains the following components:

| light isoparrafin oil (1) | 560 g |
|---|---|
| oil soluble resin (2) | 20 g |
| lime powder (3) | 387 g |
| Total | 967 g |

(1) A $C_{13}$–$C_{14}$ isoparaffin mixture available under the brand "SOLTROL 170" (0.778 g/ml), from Phillips Petroleum Company.
(2) A hydrogenated styrene-isoprene copolymer available under the brand "SHELL VIS 40", from Shell Chemical Company.
(3) "BREAKER 3700" lime powder from Nowsco Well Service, Ltd Calgary, Canada.

The oil soluble resin was sheared into the light isoparrafin oil with a Ross mixer at a setting of 5 until the temperature reached 62° C. The mixer was then shut off and the mixture allowed to cool to near room temperature. Shearing was then continued until all of the oil soluble resin was incorporated (visual observation). The lime powder was then blended into the mixture.

The sample was then split. One sample was placed into the freezer at–20° F. (–29° C.) until the temperature stabilized in order to test for the pour point. No syneresis or settling was observed and the sample remained pourable. The other sample was placed in the oven at 120° F. (49° C.) and static aged for three months. No syneresis or settling was reported.

This demonstrated that a stable liquid suspension of a lime powder was obtained.

While this invention has heed described in detail for the purpose of illustration, it is not to be construed as limited thereby but is intended to cover all changes and modifications within the spirit and scope thereof.

That which is claimed is:

1. A composition comprising an isoparaffin oil, an oil-soluble resin, and a particulate material wherein:

said isoparrafin oil is present in said composition in the range of from 40 to 95 weight percent and is selected from the group consisting of $C_{13}$ isoparaffin oils, $C_{14}$ isoparaffin oils, and combinations of two or more thereof;

said oil-soluble resin is selected from the group consisting of styrene-isoprene copolymers, hydrogenated styrene-isoprene block copolymers, styrene ethylene/propylene block copolymers, styrene isobutylene copolymers, styrene-butadiene copolymers, polybutylene, polystyrene, polyethylene-propylene copolymers, and combinations of two or more thereof; and said particulate material is selected from the group consisting of lime, sodium bicarbonate, sodium carbonate, molybdenum disulfide, sodium hydroxide, graphite, zinc, tin, quebracho, lignin, lignite, caustisized lignite, lignosulfonate, chrome lignosulfonate, naphthalenesulfonate, unintahite (gilsonite), polyvinyl alcohol, and combinations of two or more thereof.

2. A composition according to claim 1 wherein said oil-soluble resin is a hydrogenated styrene-isoprene copolymer.

3. A composition according to claim 2 wherein said particulate material is a sulfonated asphalt.

4. A composition according to claim 2 wherein said particulate material is a sulfomethylated tannin.

5. A composition according to claim 2 wherein said particulate material is quebracho.

6. A composition according to claim 2 further comprising a particulate material which is tin.

7. A composition according to claim 2 further comprising a particulate material which is lime.

8. A composition according to claim 2 wherein said isoparaffin oil is present in the range of about 55 to about 60 weight percent, said oil-soluble resin is present in the range of from about 1.8 to about 5 weight percent, and said particulate material is present in the range of from about 37 to about 45 weight percent.

9. A composition according to claim 2 further comprising a hydrophobic fumed silica.

10. A stable liquid suspension composition comprising:

(a) from 40 to 95 weight percent of an isoparaffin oil selected from the group consisting of $C_{13}$ isoparaffin oils, $C_{14}$ isoparaffin oils, and combinations of two or more thereof;

(b) from 0.2 to 10 weight percent of an oil soluble resin; and (c) from 3 to 60 weight percent of a particulate material wherein:

said oil-soluble resin is selected from the group consisting of styrene-isoprene copolymers, hydrogenated styrene-isoprene block copolymers, styrene ethylene/propylene block copolymers, styrene isobutylene copolymers, styrene-butadiene copolymers, polybutylene, polystyrene, polyethylene-propylene copolymers, and combinations of two or more thereof; and said particulate material is selected from the group consisting of lime, sodium bicarbonate, sodium carbonate, molybdenum disulfide, sodium hydroxide, graphite, zinc, tin, quebracho, lignin, lignite, caustisized lignite, lignosulfonate, chrome lignosulfonate, naphthalenesulfonate, unintahite (gilsonite), polyvinyl alcohol, and combinations of two or more thereof.

11. A composition according to claim 10 wherein said oil-soluble resin is a hydrogenated styrene-isoprene copolymer.

12. A composition according to claim 11 wherein said particulate material is a sulfonated asphalt.

13. A composition according to claim 11 wherein said particulate material is a sulfomethylated tannin.

14. A composition according to claim 11 wherein said particulate material is quebracho.

15. A composition according to claim 11 further comprising a particulate material which is tin.

16. A composition according to claim 12 further comprising a particulate material which is lime.

17. A stable liquid suspension consisting essentially of:
(a) from 40 to 95 weight percent of a $C_{13}$–$C_{14}$ isoparaffin oil,
(b) from 0.2 to 10 Weight percent of a hydrogenated styrene-isoprene copolymer and;
(c) from 3 to 60 weight percent of a particulate material selected from the group consisting of sulfonated asphalts, sulfomethylated tannin, tin, quebracho, lime, and combinations of two or more thereof.

18. A stable liquid suspension according to claim 17 wherein said particulate material is sulfonated asphalt.

19. A stable liquid suspension consisting essentially of
(a) from 55 to 60 weight percent of a $C_{13}$–$C_{14}$ isoparaffin oil,
(b) from 1.8 to 55 weight percent of a hydrogenated styrene-isoprene copolymer and;
(c) from 37 to 45 weight percent of a particulate material selected from the group consisting of sulfonated asphalts, sulfomethylated tannin, tin, quebracho, lime, and combinations of two or more thereof.

20. A stable liquid suspension according to claim 19 wherein said particulate material is sulfonated asphalt.

* * * * *